Patented May 1, 1928.

1,667,895

UNITED STATES PATENT OFFICE.

WILLIAM R. JOHNSTON, OF LINCOLN, NEBRASKA.

PRESERVATIVE AND PROCESS OF PRESERVING YEAST THEREWITH.

No Drawing.   Application filed October 16, 1924. Serial No. 744,069.

This invention relates generally to food products, and particularly to a preserved form of active yeast, but the novelty in the invention resides not only in the product but also in the preserving preparation and the process for preserving yeast with the preparation.

The utility in the invention will be readily recognized by those familiar with the keeping qualities of compressed or moist yeast, as it is well known that compressed or moist yeast will not ordinarily keep but will spoil soon after being made unless preserved in some manner. The present invention has been devised in order to easily prepare a form of active yeast which will keep indefinitely.

According to the invention a mass of compressed or moist yeast is mixed with a liquid preservative and a quantity of granulated drying substance, and after this has been done the mixture is dried, forming a granular mass. In this mass the yeast is in the form of a coating upon the various particles or grains of the drying substance, and the preservative is in the form of a film around the yeast coating keeping the latter practically sealed against the action of the air.

The liquid preservative preferably consists of flax seed syrup and hop tea. The flax seed syrup is made by boiling a quantity of whole flax seed in water. For instance, one ounce of flax seed may be added to one and one-half pints of cold water, and boiled until the mixture becomes stringy or pasty. The mixture should then be strained and the filtrate preserved for further use.

The hop tea may be made by placing one ounce of dry hops, one ounce of salt and one-half ounce of cream of tartar in three pints of cold water and boiling the mixture for about three minutes. This boiling is only done for the purpose of extracting the essence out of the dry ingredients, so that the exact amount of boiling is not essential except that the boiling should not take place for such a length of time as to cause a coloring of the liquid. After the boiling of the mixture has been effected, it should be strained and the filtrate preserved for future use.

The flax seed syrup and the hop tea, that is, the two filtrates which have just been described, should then be mixed together. Three parts of the flax seed syrup should be added to thirteen parts of the hop tea. This mixture forms a preserving preparation.

In using the liquid preservative a quantity of it should be added to a quantity of compressed yeast and after this has been mixed together until a smooth cream is formed a quantity of granulated drying substance should be added and mixed and then the mixture should be dried. In doing this, for instance, two-thirds of a pint of the liquid preservative may be added to about a pound of compressed yeast, and after these substances have been thoroughly mixed together until a smooth cream is formed about one and one-eighth pounds of corn meal or two-thirds of a pound of finely cracked tapioca should be added. Cracked rice may be used instead of corn meal or cracked tapioca. If corn meal is used it may be best to first treat this with sodium benzoate to prevent it from becoming musty or decomposing. As previously described after the corn meal, cracked tapioca or cracked rice is added to the cream formed from the compressed yeast and the liquid preservative, the mixture should be thoroughly dried, and in so drying the temperature should be kept so as to not exceed 90°.

The function of the corn meal, cracked tapioca or cracked rice, whichever is used, is that of a drier. It forms a substance upon which the yeast will fasten itself, that is, become coated, and then the preservative will find its way to the outside of the yeast coated particles and form a film around the yeast coating. In using this preservative the yeast itself never becomes dry. In performing the function of a drier, the corn meal, cracked tapioca or the like acts in the nature of a sponge and absorbs the moisture that is given up by the preservative as it forms the film or coating on the outside and which excludes the air. This film or coating of the preservative forms an air tight cyst or capsule enclosing a small particle of the corn meal, cracked tapioca or the like, which has absorbed a quantity of moisture and to which some of the yeast cells have fastened themselves. The preservative drys very quickly, and the air-tight coating or capsule is formed in a very short time. This coating prevents evaporation of the moisture which the carrying agent has absorbed, and which the yeast cells themselves contain.

This moisture, hermetically sealed within the cyst or capsule and which cannot escape therefrom will preserve the yeast in an active form for a period of several weeks or months or long enough to eliminate waste and difficulty in marketing the product. Moreover the yeast will not ferment or sour because no air can get to it. The flax seed syrup forms the film excluding air from the yeast, while the hops act as a preservative for the yeast, keeping it from fermenting and souring and providing food for the same to keep it alive. Thus, the yeast as preserved is not dry dormant yeast, but is really moist active yeast. The complete product appears as a granular substance with somewhat of a crystalline exterior. When this is placed in water the preservative will dissolve, releasing the yeast, and if desired the granulated drying substance could then be strained off and eliminated.

From the foregoing description it is believed that the invention will be sufficiently understood by those skilled in the art to which it appertains to make use of the same, so that further description is thought to be unnecessary.

It is obvious that other drying substances besides the ones disclosed may be used without departing from the spirit of the invention or sacrificing any of the advantages thereof, and it is also obvious that the specified proportions of the ingredients need not necessarily be followed, so that changes of this nature are intended to come within the meaning and scope of the appended claims, as well as use of the preserving preparation and process in connection with other substances besides yeast.

I claim:

1. A preservative of the class described composed of a condensed mixture of flax seed and water, and a tea made from hops, salt, cream of tartar and water.

2. The herein described process of preserving moist yeast in an active state consisting in mixing compressed moist yeast with a condensed air sealing and preservative solution of flaxseed and water and tea made from hops until a smooth cream is formed, mixing with this cream a granular liquid absorbing substance such as cornmeal, then drying the mixture, said flaxseed and water forming an air excluding film around the grains of said granular substance and the moist yeast cells adhering thereto and the hop-tea absorbed thereby.

In testimony whereof I have hereunto affixed my signature.

WILLIAM R. JOHNSTON.